US007127173B2

(12) United States Patent
Georges

(10) Patent No.: US 7,127,173 B2
(45) Date of Patent: Oct. 24, 2006

(54) METHOD OF ADJUSTING POWER FOR A WAVELENGTH-DIVISION MULTIPLEXED OPTICAL TRANSMISSION SYSTEM

(75) Inventor: Thierry Georges, Perros-Guirec (FR)

(73) Assignee: Corvis Algety SA(FR)

( * ) Notice: Subject to any disclaimer, the term of this patent is extended or adjusted under 35 U.S.C. 154(b) by 654 days.

(21) Appl. No.: 10/127,804

(22) Filed: Apr. 22, 2002

(65) Prior Publication Data

US 2002/0176133 A1 Nov. 28, 2002

(30) Foreign Application Priority Data

Oct. 22, 1999 (FR) .................................. 99 13194
Oct. 20, 2000 (WO) ...................... PCT/FR00/02924

(51) Int. Cl.
*H04J 14/02* (2006.01)
(52) U.S. Cl. .................... 398/94; 398/160; 398/197; 398/198; 359/341.4
(58) Field of Classification Search ................ 398/94, 398/149, 151, 160, 196–198, 30; 372/20, 372/29.012
See application file for complete search history.

(56) References Cited

U.S. PATENT DOCUMENTS

| 4,315,666 | A | 2/1982 | Hicks, Jr. ............... 350/96.15 |
| 4,342,499 | A | 8/1982 | Hicks, Jr. ............... 350/96.15 |
| 4,401,364 | A | 8/1983 | Mochizuki .............. 350/96.16 |
| 4,616,898 | A | 10/1986 | Hicks, Jr. ............... 350/96.15 |
| 4,699,452 | A | 10/1987 | Mollenauer et al. ..... 350/96.16 |
| 4,728,170 | A | 3/1988 | Robertson .............. 350/96.15 |
| 4,881,790 | A | 11/1989 | Mollenauer ............. 350/96.16 |
| 5,007,705 | A | 4/1991 | Morey et al. ........... 350/96.29 |
| 5,039,199 | A | 8/1991 | Mollenauer et al. ....... 359/334 |
| 5,050,949 | A | 9/1991 | DiGiovanni ............... 359/341 |
| 5,083,874 | A | 1/1992 | Aida et al. .................. 385/24 |
| 5,095,519 | A | 3/1992 | Dorsey ....................... 385/140 |
| 5,191,586 | A | 3/1993 | Huber ........................ 372/6 |
| 5,191,628 | A | 3/1993 | Byron ....................... 385/27 |
| 5,225,922 | A | * 7/1993 | Chraplyvy et al. .......... 398/94 |
| 5,228,105 | A | 7/1993 | Glista ......................... 385/89 |
| 5,283,686 | A | 2/1994 | Huber ........................ 359/337 |
| 5,323,404 | A | 6/1994 | Grubb ........................ 372/6 |
| 5,406,411 | A | 4/1995 | Button et al. ............... 359/341 |
| 5,473,622 | A | 12/1995 | Grubb ........................ 372/6 |
| 5,500,756 | A | 3/1996 | Tsushima et al. ........... 359/174 |
| 5,530,583 | A | 6/1996 | Uno et al. ................... 359/341 |
| 5,541,766 | A | 7/1996 | Mizrahi et al. ............. 359/337 |
| 5,557,442 | A | 9/1996 | Huber ........................ 359/179 |
| 5,559,910 | A | 9/1996 | Taga et al. .................. 385/24 |
| 5,579,143 | A | 11/1996 | Huber ........................ 359/130 |

(Continued)

FOREIGN PATENT DOCUMENTS

EP   0575 881 A1   12/1993

(Continued)

OTHER PUBLICATIONS

Park, S.Y., et al., Feasibility Demonstration of 10 Gbit/s Channel WDM Network Using Dynamic Gain-Controlled EDFAs, Electronics Letters, Mar. 5, 1998, vol. 34, No. 5., Online No. 19980346.

(Continued)

*Primary Examiner*—Dzung Tran

(57) ABSTRACT

Adjusting power for a WDM optical transmission system comprising emitter means, an optical transmission line, and receiver means, the method being characterized in that for each wavelength channel, the power emitted for said channel by the emitter means is adjusted as a function of the optical powers received for said channel at a plurality of points distributed along the transmission line.

9 Claims, 1 Drawing Sheet

U.S. PATENT DOCUMENTS

| | | | |
|---|---|---|---|
| 5,611,016 A | 3/1997 | Fangmann et al. | 385/100 |
| 5,623,508 A | 4/1997 | Grubb et al. | 372/3 |
| 5,633,974 A | 5/1997 | Chia | 385/140 |
| 5,636,301 A | 6/1997 | O'Sullivan et al. | 385/24 |
| 5,651,085 A | 7/1997 | Chia | 385/140 |
| 5,673,280 A | 9/1997 | Grubb et al. | 372/3 |
| 5,675,432 A | 10/1997 | Kosaka | 359/341 |
| 5,694,512 A | 12/1997 | Gonthier et al. | 385/140 |
| 5,696,615 A | 12/1997 | Alexander | 359/134 |
| 5,717,510 A | 2/1998 | Ishikawa et al. | 359/161 |
| 5,764,406 A | 6/1998 | Newhouse et al. | 359/341 |
| 5,805,621 A | 9/1998 | Grubb et al. | 372/6 |
| 5,812,710 A | 9/1998 | Sugaya | 385/24 |
| 5,815,299 A | 9/1998 | Bayart et al. | 359/171 |
| 5,815,710 A | 9/1998 | Martin et al. | 395/683 |
| 5,861,981 A | 1/1999 | Jabr | 359/341 |
| 5,880,866 A | 3/1999 | Stolen | 359/138 |
| 5,883,736 A | 3/1999 | Oshima et al. | 359/341 |
| 5,892,615 A | 4/1999 | Grubb et al. | 359/341 |
| 5,900,969 A | 5/1999 | Srivastava et al. | 359/341 |
| 5,903,371 A | 5/1999 | Arecco et al. | 359/119 |
| 5,920,423 A | 7/1999 | Grubb et al. | 359/341 |
| 5,940,208 A | 8/1999 | Blaszyk et al. | 359/341 |
| 5,959,750 A | 9/1999 | Eskildsen et al. | 359/134 |
| 5,963,361 A | 10/1999 | Taylor et al. | 359/337 |
| 5,999,548 A | 12/1999 | Mori et al. | 372/22 |
| 6,031,646 A | 2/2000 | Sniadower | 359/160 |
| 6,040,933 A * | 3/2000 | Khaleghi et al. | 398/1 |
| 6,055,092 A | 4/2000 | Sugaya et al. | 359/337 |
| 6,057,959 A | 5/2000 | Taylor et al. | 359/341 |
| 6,081,366 A | 6/2000 | Kidorf et al. | 359/341 |
| 6,115,174 A | 9/2000 | Grubb et al. | 359/334 |
| 6,118,575 A | 9/2000 | Grubb et al. | 359/337 |
| 6,122,298 A | 9/2000 | Kerfoot, III et al. | 372/6 |
| 6,147,794 A | 11/2000 | Stentz | 359/334 |
| 6,151,338 A | 11/2000 | Grubb et al. | 372/6 |
| 6,173,588 B1 | 1/2001 | Berkey et al. | 65/407 |
| 6,181,465 B1 | 1/2001 | Grubb et al. | 359/337 |
| 6,212,310 B1 | 4/2001 | Waarts et al. | 385/24 |
| 6,229,935 B1 | 5/2001 | Jones et al. | 385/24 |
| 6,236,498 B1 | 5/2001 | Freeman et al. | 359/341 |
| 6,292,603 B1 | 9/2001 | Mizuochi et al. | 385/24 |
| 6,321,015 B1 | 11/2001 | Doran et al. | 385/123 |
| 6,392,769 B1 * | 5/2002 | Ford et al. | 398/9 |
| 2003/0053163 A1 * | 3/2003 | Li et al. | 359/110 |

FOREIGN PATENT DOCUMENTS

| | | |
|---|---|---|
| EP | 0 734 105 A2 | 9/1996 |
| EP | 0853396 A2 | 7/1998 |
| WO | WO 97 20403 | 6/1997 |
| WO | WO 98/42088 | 9/1998 |
| WO | WO 99/07088 | 2/1999 |
| WO | WO 99/43107 | 8/1999 |
| WO | WO 01/29994 A1 | 4/2001 |
| WO | WO 01/29995 A1 | 4/2001 |

OTHER PUBLICATIONS

Dung, J.C., et al., Gain Flattening of Erbium Doped Fibre Amplifier Using Fibre Bragg Gratings, Electronics Letters, Mar. 19, 1998, vol. 34, No. 6., Online No. 19980446.

Yu, A., et al., Analysis of Optical Gain and Noise Spectral Properties of Erbium-Doped Fiber Amplifier Cascade, Optical Amplifiers and their Application, Aug. 3-5, 1994, 1994 OSA Technical Digest Series, V14, pp. FBI-1-3/124-126.

Masuda, H., et al., Ultra-Wideband Optical Amplification With a 3-dB Bandwidth of 67 nm Using a Partially Gain Flattened Erbium-Doped Fiber Amplifier and Raman Amplification, Optical Amplifiers and their Application, Aug. 3-5, 1994, 1997 OSA Technical Digest Series, V20, pp. MC3-1-4/40-3.

Sugaya, Y., et al., Novel Configuration for Low-Noise and Wide-Dynamic-Range Er-Doped Fiber Amplifiers for WDM Systems, Optical Amplifiers and their Application, Jun. 15-17, 1995, 1995 OSA Technical Digest Series, V18, pp. FC3-1-4/158-161.

Jacobovitz-Veselka, G.R., et al., Single-Stage Booster Amplifier With Two 980 nm Pumps Stabilized by Fiber Gratings, Optical Amplifiers and their Applicaiton, Jun. 15-17, 1995, 1995 OSA Technical Digest Series, V18, pp. FC4-1-4/162-165.

Hansen, P.B., et al., Loss Compensation in Dispersion Compensating Fiber Modules by Raman Amplification, OFC' 98 Technical Digest pp. 20-21.

Rottwitt, K., et al., Detailed Analysis of Raman Amplifiers for Long-Haul Transmission, OFC' 98 Technical Digest pp. 30-31.

Chernikov, S.V., et al., 10 Gbit/s Error-Free Transmission of 2-ps Pulses Over A 45-km Span Using Distributed Raman Amplification at 1300 nm, OFC' 98 Technical Digest p. 31.

Kawai, S., et al., Ultrawide 75 nm 3-dB Gain-Band Optical Amplifier Utilizing Erbium-Doped Fluoride Fiber and Raman Fiber, OFC' 98 Technical Digest pp. 32-33.

Dianov, E.M., et al., Highly Efficient 1.3 µm Raman Amplifier, OFC' 98 Technical Digest pp. 33-34.

Rottwitt, K., et al., A 92 nm Bandwidth Raman Amplifier, OFC' 98, Post-Deadline Paper PD6-1-4.

Srivastava, A. K., et al., 1 Tb/s Transmission of 100 WDM 10 Gb/s Channels Over 400 km of TrueWave Fiber, OFC' 98, Post-Deadline Paper PD10-1-4.

Masuda, H., et al., Ultra-Wideband Hybrid Amplifier Comprising Distributed Raman Amplifier and Erbium-Doped Fiber Amplifier, Electronics Letters, Jun. 25, 1998, vol. 34, No. 13, Online No. 19980935.

Takano, K., et al., An Optical Pre-Amplifier With Automatic Gain Control Function, Proceedings of the 1995 IEICE General Conference, Mar. 27-30, 1995, Fukuoka, Fukuoka Institute of Technology b-1067, p. 513.

Zou et al., Compensation of Raman Scattering and EDFA's Non-uniform Gain in Ultra-Long-Distance WDM Links, IEEE Photonics Technology Letters, vol. 8, No. 1, Jan. 1996, pp. 139-141.

Stentz, A., et al., "Analog-Grade Power Raman Ring Amplifier at 1.3um" OSA Trends in Optics and Photonics, vol. 5, Optical Amplifiers and Their applications. From the Topical Meeting, pp. 350-368, Published: Washington, DC, USA, 1996.

Wen, Senfar, et al., "Distributed Erbium-Doped Fiber Amplifiers with Stimulated Raman Scattering", IEEE Photonics Technology Letters, Feb. 1992, vol. 4, No. 2, New York, US, pp. 189-192, IEEE Log No.: 9105789.

Aida, K., et al., Long-Span Repeaterless IM/DD Optical Transmission Experiment over 300 KM using Optical Amplifies, ICC '91, vol. 3, pp. 1228-1232, 1991, Published: New York, NY, USA.

Grubb, S. G., Raman Amplifiers for Broadband Communications, OFC '98, OSA Technical Digest Series vol. 2, 1998, abstract.

Suzuki, M., et al., "170 Gbit/s transmission over 10,850 km using large core transmission fiber", OFC' 98, Post deadline paper, pp. PD17-1-PD17-4, San Jose, California, USA.

Taga, H., Edagawa, N., Suzuki, M., Takeda, N., Imai, K., Yamamoto, S. and Akiba, S., "213 Gbit/s (20×10.66) over 9000km transmission experiment using dispersion-slope compensator", OFC' 98, Post deadline paper, pp. PD13-1—PD-13-4, San Jose, California, USA.

Kubota, Hirokazu, et al., "Partial Soliton Communication System", Optics Communications 87, (1992) p. 15-18.

Chraplyvy, et al., "Equalization in amplified WDM lightwave transmission systems", IEEE Photonics, Technical Letters vol. 4, No. 8, Aug. 1992, pp. 920-922.

Chraplyvy, et al., "End-to-End equalization experiments in amplified WDM lightwave systems", IEEE Photonics, Technical Letters vol. 4, No. 4, pp. 428-429, Apr. 1993.

* cited by examiner

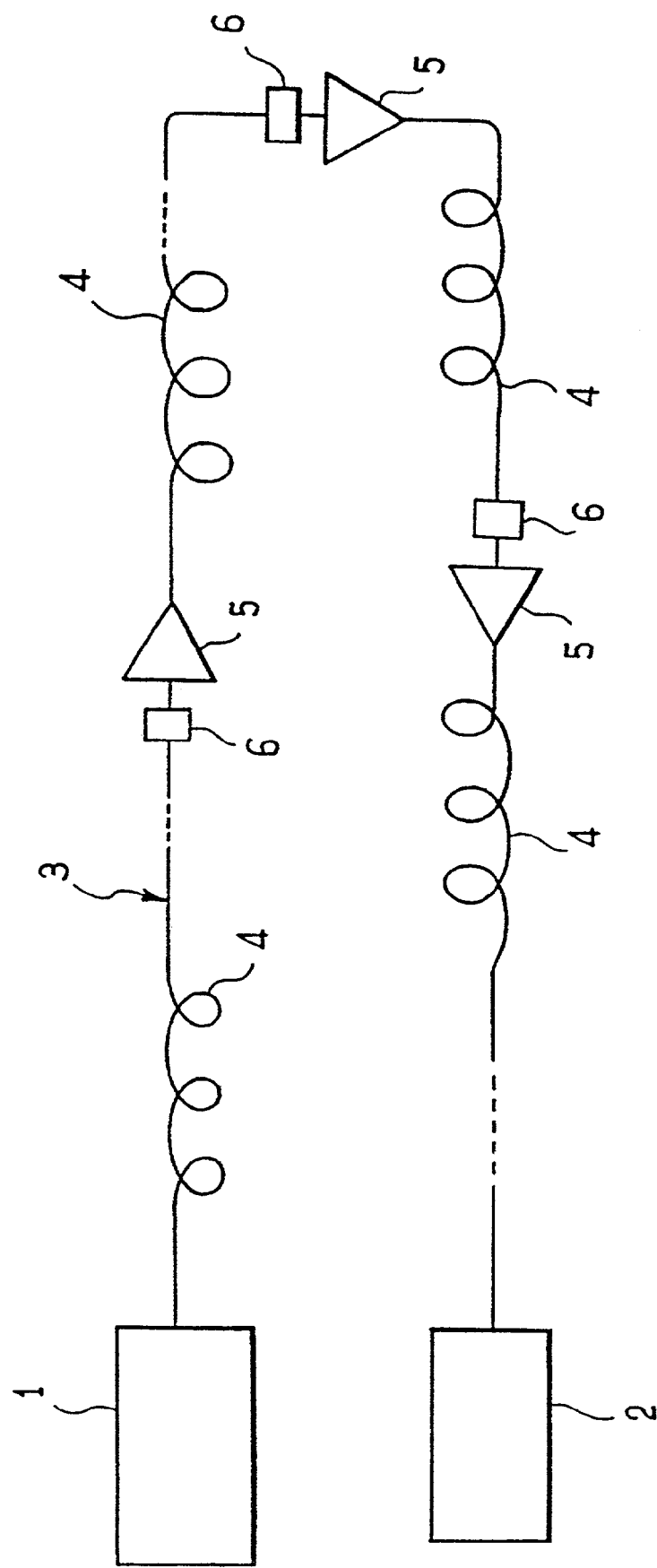
FIG_1

METHOD OF ADJUSTING POWER FOR A WAVELENGTH-DIVISION MULTIPLEXED OPTICAL TRANSMISSION SYSTEM

CROSS REFERENCE TO RELATED APPLICATIONS

This application claims priority from PCT application number PCT/FR00/02924, filed Oct. 20, 2000, which is based on French national application number 99/13194, filed Oct. 22, 1999.

STATEMENT REGARDING FEDERALLY SPONSORED RESEARCH AND DEVELOPMENT

Not applicable.

BACKGROUND OF THE INVENTION

The present invention relates to a method of adjusting power for a wavelength-division multiplexed (WDM) optical transmission system.

Digital optical channel transmission, in particular over an amplified link, is limited firstly at low powers by noise and secondly at high powers by non-linear effects.

In any amplified link, there exists an optimum outlet power level from each of the amplifiers which ensures the lowest possible error rate.

For transmission without wavelength-division multiplexing, the optimum power can be adjusted by the power of the pump in each amplifier.

However, when the transmission uses wavelength-division multiplexing, it is no longer possible to adjust the gain of each of the signals individually, since the response of the amplifiers is not flat with varying wavelength.

Three main techniques have been described for resolving this problem.

One of those techniques consists in optimizing the dopants of the amplifying fiber and in optimizing mean population inversion: flatness of about 1.5 decibels (dB) over 30 nanometers (nm) can thus be obtained for gain of 25 dB.

In this respect, reference can be made to the following publication:

K. Inoue, T. Kominato, H. Toba, IEEE Photon. Techn. Letters 3, 718 (1991);

Sulhoff, Smart, Zyskind, Nagel, DiGiovanni, "Gain peaking in concatenated 980-nm-pumped EDFAs", OFC'94, p. 40 (1994).

Another technique consists in using optical filters.

In general, those first two techniques are used for the purpose of limiting variations in gain to a few tenths of a decibel.

A third technique consists in pre-emphasizing the signals, i.e. in reducing inlet power at those wavelengths that have higher gain and in increasing inlet power of signals for which gain is lower. Pre-emphasis is considered to be optimized when the signal-to-noise ratios in the various channels are equal.

A technique of that type is described in particular in:

Chaplyvy, Nagel, Tkach, "Equalization in amplified WDM lightwave transmission systems", IEEE Photon. Techn. Lett. 4, 8 (1992);

Chraplyvy, Tkach, Reichmann, Magill, Nagel, "End-to-end equalization experiments in amplified WDM lightwave systems", IEEE Photon. Techn. Lett. 4, 428 (1993).

Nevertheless, that technique cannot correct cumulative gain differences of more than 25 dB. In addition, it increases the non-linear penalty for given signal-to-noise ratio.

Furthermore, one of the main sources of degradation in a WDM terrestrial transmission system having amplifiers with equalized gain is the way the gain characteristic curve varies as a function of temperature. This variation is about 1 dB per 25 dB of gain over a temperature range of 50° C. Variation in line losses is another factor that degrades the flatness of amplifier gain.

To resolve that problem, proposals have been made, in particular in European patent application No. 0 580 497, for a device which adjusts the source parameters as a function of the error rate on reception, as estimated or as measured.

Nevertheless, information concerning error rate is not always available on reception.

Proposals have already been made, in particular in Japanese patent abstract No. JP 08 223136 for techniques which consist in equalizing gains at each of the amplifiers in a transmission line.

BRIEF SUMMARY OF THE INVENTION

The invention proposes a method which makes it simple to equalize continuously the transmission performance of the various wavelength division multiplexed channels.

More particularly, the invention provides a method of adjusting power for a WDM optical transmission system comprising emitter means, an optical transmission line, and receiver means, the method being characterized in that for each wavelength channel, the power emitted for said channel by the emitter means is adjusted as a function of the optical powers received for said channel at a plurality of points distributed along the transmission line.

Such a method is advantageously associated with the various following characteristics taken singly or in any technically feasible combination:

- the various points distributed along the transmission line are the inlets to amplifiers distributed along said line;
- for each channel, a reference power is continuously determined as a function of the optical powers received for said channel at a plurality of points distributed along the transmission line, said reference power being the power that ought to be received for said channel at one of the points along the transmission line, and the emitter means are controlled so as to servo-control the power at said point on said reference power;
- said point is the inlet to the first amplifier;
- for each channel $i$, a parameter $f_i$ is determined which is a function of the powers received at the various points of the transmission line, and the reference power is modified by replacing its preceding value with a reference value that is a function of said preceding value and also of the parameter $f_i$;
- the new reference power is the product of the preceding reference power and a function of the parameter $f_i$;
- the parameter $f_i$ is compared with the mean $\bar{f}$ of the parameters $f_i$ as determined for the various channels;
- the parameter $f_i$ is such that:

$$f_i = \sum_{j=1,m} P_{ij}^{-1}$$

where $P_{ij}$ represents the power at the jth point of the transmission line for channel i and where m is the number of points of said line; and the new reference power is the product of the preceding reference value and a product $\eta \cdot f_i$, where the parameter $\eta$ is selected to avoid modifying the total power of the signals on emission.

The invention also provides an optical transmission system, in particular of return-to-zero (RZ) type pulses, characterized in that it includes means for implementing such a method.

Other characteristics and advantages of the invention appear further from the following description which is purely illustrative and non-limiting, and which can be read with reference to the accompanying drawing in which FIG. 1 is a diagram of an optical transmission system in which a method of the invention can be implemented.

BRIEF DESCRIPTION OF THE DRAWING

FIG. 1 is a diagram of an optical transmission system in which a method of the invention can be implemented.

DETAILED DESCRIPTION OF THE INVENTION

The transmission system shown in the FIGURE comprises emitter means 1, receiver means 2, and a transmission line 3 which, for example, is a terrestrial transmission line and extends between said emitter and receiver means 1 and 2.

The emitter means 1 and the receiver means 2 include multiplexing and demultiplexing means enabling a plurality of channels to be transmitted simultaneously over the line 3, said channels corresponding to different transmission wavelengths.

The signals they emit and receive are advantageously signals in the form of RZ pulses, and in particular solitons.

The line 3 comprises a plurality of optical fiber sections 4 with amplifiers 5 interposed between them.

In a manner that is entirely conventional for any transmission line, the line 3 includes means 6 interposed at each amplifier 5 for the purpose of measuring or deducing the power inlet to such an amplifier 5 and for returning information concerning said power to the emitter means 1, e.g. by using an auxiliary optical channel that corresponds to a wavelength different from those of the transmission channels.

Thus, the emitter means 1 are continuously aware of the power $P_{ij}$ which is the power of channel i at the inlet to amplifier j, with this applying to i lying in the range 1 to n and j lying in the range 1 to m, where n is the number of transmission channels, and where m is the number of amplifiers 5.

The emitter means 1 include calculation means which, for each channel i and as a function of the various powers $P_{ij}$ measured for said channel i at the inlet of each of the m amplifiers, determine a power level $P_{i1}$ which ought to be applied to the inlet of the first amplifier for said channel i. Said emitter means then adjust the power they emit for said channel i so as to cause it to converge on said value.

For example, the calculation means determine for each channel i a value $f_i$ which is a function of the powers $(P_{ij})_{j=1,m}$.

They calculate the mean $\bar{f}$ of the functions $f_i$ and they relate said functions $f_i$ to said mean.

They modify the inlet power reference by replacing $P_{i0}$ with $P'_{i0}$ such that:

$P'_{i1} = \eta G(f_i) P_{i1}$ where $\eta$ is such that $$\sum_i P'_{i1} = \sum_i P_{i1}$$

where G is a predetermined function.

A particularly advantageous function $f_i$ is:

$$f_i = \sum_{j=1,m} P_{ij}^{-1}$$

More refined functions can be envisaged that take account of amplifier gain or variation in noise factor as a function of wavelength.

It will be observed that the values $f_i$ can be calculated by the calculation means or can be obtained by any other means, and in particular by analog means using the signals transmitted over the auxiliary channel.

The function G advantageously corresponds to the function:

$G(x) = x$

Other functions can be envisaged, in particular for accelerating convergence.

The function G can also depend on in-line powers and can include a peak-limiting function to limit non-linear effects.

Another example of the function $f_i$ which is advantageous when it is not possible to measure in-line powers or when it is desired not to interfere with the automatic gain equalization routines in-line, so as to avoid instabilities, is the following:

$f_i = 1/(P_{i1} \cdot P_{im})^{1/2}$

It would also be observed that the above-described technique is particularly effective when the signal used is in RZ format, and in particular is in the form of solitons, since the non-linear limits are then offset towards high powers.

The invention claimed is:

1. A method of adjusting power for a WDM optical transmission system comprising emitter means, an optical transmission line, and receiver means, comprising adjusting for each wavelength channel, the power emitted for said channel by the emitter means as a function of the optical powers received for said channel at the inlet to the first amplifier, wherein for each channel a reference power is continuously determined as a function of the optical powers received for said channel at the inlet to the first amplifier, said reference power being the power that ought to be received for said channel at the inlet to the first amplifier, and the emitter means are controlled so as to servo-control the power at said inlet on said reference power, wherein for each channel i, a parameter $f_i$ is determined which is a function of the powers received at the inlet to the first amplifier, and in that the reference power is modified by replacing its preceding value with a reference value that is a function of said preceding value and also of the parameter $f_i$, wherein the parameter $f_i$ is such that:

$$f_i = \sum_{j=1,m} P_{ij}^{-1}$$

where $P_{ij}$ represents the power at the jth point of the transmission line for channel i and where m is the number of points of said line.

2. A method according to claim 1, wherein the new reference power is the product of the preceding reference power and a function of the parameter $f_i$.

3. A method according to claim 1, wherein the parameter $f_i$ is related to the mean $\bar{f}$ of the parameters $f_i$ as determined for the various channels.

4. A method of adjusting power for a WDM optical transmission system comprising emitter means, an optical transmission line, and receiver means, comprising adjusting for each wavelength channel, the power emitted for said channel by the emitter means as a function of the optical powers received for said channel at the inlet to the first amplifier, wherein for each channel a reference power is continuously determined as a function of the optical powers received for said channel at the inlet to the first amplifier, said reference power being the power that ought to be received for said channel at the inlet to the first amplifier, and the emitter means are controlled so as to servo-control the power at said inlet on said reference power, wherein for each channel i, a parameter $f_i$ is determined which is a function of the powers received at the inlet to the first amplifier, and in that the reference power is modified by replacing its preceding value with a reference value that is a function of said preceding value and also of the parameter $f_i$, characterized in that the parameter $f_i$ is such that:

$$f_i = 1/(P_{i1} \cdot P_{im})^{1/2}$$

wherein, $P_{i1}$ is the power of the $i^{th}$ channel at the $1^{st}$ amplifier and $P_{im}$ is the power of the $i^{th}$ channel at the $m^{th}$ amplifier.

5. A method according to claim 4, wherein the new reference power is the product of the preceding reference power and a function of the parameter $f_i$.

6. A method according to claim 4, wherein the parameter $f_i$ is related to the mean $\bar{f}$ of the parameters $f_i$ as determined for the various channels.

7. A method of adjusting power for a WDM optical transmission system comprising emitter means, an optical transmission line, and receiver means, comprising adjusting for each wavelength channel, the power emitted for said channel by the emitter means as a function of the optical powers received for said channel at the inlet to the first amplifier, wherein for each channel a reference power is continuously determined as a function of the optical powers received for said channel at the inlet to the first amplifier, said reference power being the power that ought to be received for said channel at the inlet to the first amplifier, and the emitter means are controlled so as to servo-control the power at said inlet on said reference power, wherein for each channel i, a parameter $f_i$ is determined which is a function of the powers received at the inlet to the first amplifier, and in that the reference power is modified by replacing its preceding value with a reference value that is a function of said preceding value and also of the parameter $f_i$, wherein the new reference power is the product of the preceding reference value and a function of $f_i$, wherein the function is a product $\eta \cdot f_i$, $\eta$ being a weighting factor selected so that the total power received by the first amplifier is constant.

8. A method according to claim 7, wherein the new reference power is the product of the preceding reference power and a function of the parameter $f_i$.

9. A method according to claim 7, wherein the parameter $f_i$ is related to the mean $\bar{f}$ of the parameters $f_i$ as determined for the various channels.

* * * * *

UNITED STATES PATENT AND TRADEMARK OFFICE
CERTIFICATE OF CORRECTION

PATENT NO. : 7,127,173 B2  Page 1 of 1
APPLICATION NO. : 10/127804
DATED : October 24, 2006
INVENTOR(S) : Thierry Georges It is certified that error appears in the above-identified patent and that said Letters Patent is hereby corrected as shown below:

Title Page; line 1; (57) Abstract – Insert -- A method of -- before "Adjusting power for a"

Item (56); Page 2, left column, U.S. PATENT DOCUMENTS – 15th cited patent document, delete "Martin et at." and insert -- Bayart et al. --

Item (56): Page 2, left column, U.S. PATENT DOCUMENTS – 35th cited patent document, delete "Stentz" and insert -- Stenz --

Signed and Sealed this

First Day of December, 2009

David J. Kappos
*Director of the United States Patent and Trademark Office*